US009570750B2

(12) United States Patent
Lee et al.

(10) Patent No.: US 9,570,750 B2
(45) Date of Patent: Feb. 14, 2017

(54) ANODE, LITHIUM BATTERY COMPRISING THE ANODE, BINDER COMPOSITION, AND METHOD OF MANUFACTURING THE ELECTRODE

(71) Applicant: Samsung SDI CO., Ltd., Yongin-si, Gyeonggi-do (KR)

(72) Inventors: Beom-Wook Lee, Yongin-si (KR); Bum-Jin Chang, Yongin-si (KR); Hye-Sun Jeong, Yongin-si (KR)

(73) Assignee: SAMSUNG SDI CO., LTD., Yongin, Gyeonggi-do (KR)

( * ) Notice: Subject to any disclaimer, the term of this patent is extended or adjusted under 35 U.S.C. 154(b) by 88 days.

(21) Appl. No.: 13/768,277

(22) Filed: Feb. 15, 2013

(65) Prior Publication Data

US 2014/0038046 A1    Feb. 6, 2014

(30) Foreign Application Priority Data

Aug. 1, 2012    (KR) ........................ 10-2012-0084585

(51) Int. Cl.
| | |
|---|---|
| *H01M 4/62* | (2006.01) |
| *H01M 4/134* | (2010.01) |
| *H01M 4/1395* | (2010.01) |
| *H01M 4/04* | (2006.01) |
| *H01M 4/02* | (2006.01) |

(52) U.S. Cl.
CPC ........... *H01M 4/622* (2013.01); *H01M 4/0471* (2013.01); *H01M 4/134* (2013.01); *H01M 4/1395* (2013.01); *H01M 2004/021* (2013.01); *Y02E 60/122* (2013.01); *Y02P 70/54* (2015.11)

(58) Field of Classification Search
CPC ...... H01M 4/13; H01M 4/134; H01M 4/1395; H01M 4/622; H01M 4/0471; H01M 10/052; H01M 2004/021; Y02E 60/122
See application file for complete search history.

(56) References Cited

U.S. PATENT DOCUMENTS

| 7,138,208 | B2 | 11/2006 | Tanjo et al. |
| 7,910,240 | B2 | 3/2011 | Lee et al. |
| 8,877,386 | B2 * | 11/2014 | Yamasaki ..................... 429/232 |
| 2006/0151318 | A1 | 7/2006 | Park et al. |
| 2007/0264568 | A1 | 11/2007 | Ryu et al. |

(Continued)

FOREIGN PATENT DOCUMENTS

| KR | 10-2006-0082190 A | 7/2006 |
| KR | 10-2006-0110235 A | 10/2006 |

(Continued)

OTHER PUBLICATIONS

Office Action mailed May 18, 2016, issued in corresponding KR Application No. 10-2012-84585.

*Primary Examiner* — Raymond Alejandro
(74) *Attorney, Agent, or Firm* — Knobbe Martens Olson & Bear LLP

(57) ABSTRACT

An anode including; an anode active material; and a porous binder including a nanopore, wherein an anode mixture density is about 1.5 g/cc or greater, a lithium battery including the anode and a binder composition. A method of manufacturing the anode material using a polymer that is thermally decomposed in a vacuum at about 200° C. or higher for about 1 hour.

9 Claims, 2 Drawing Sheets

(56) References Cited

U.S. PATENT DOCUMENTS

| | | | |
|---|---|---|---|
| 2008/0311480 A1* | 12/2008 | Sano | H01M 4/13 |
| | | | 429/322 |
| 2009/0053607 A1 | 2/2009 | Jeong et al. | |
| 2009/0246632 A1 | 10/2009 | Fukui et al. | |

FOREIGN PATENT DOCUMENTS

| KR | 10-2007-0076151 A | 7/2007 |
|---|---|---|
| KR | 2009-0020933 A | 2/2009 |
| KR | 10-2009-0103807 | 10/2009 |
| KR | 1020110135306 A | 12/2011 |

\* cited by examiner

ANODE, LITHIUM BATTERY COMPRISING THE ANODE, BINDER COMPOSITION, AND METHOD OF MANUFACTURING THE ELECTRODE

CROSS-REFERENCE TO RELATED APPLICATIONS

This application claims the benefit of Korean Patent Application No. 10-2012-0084585, filed on Aug. 1, 2012 in the Korean Intellectual Property Office, the disclosures of which are incorporated herein in their entirety by reference.

BACKGROUND

Field

One or more embodiments relate to an anode, a lithium battery including the anode, a binder composition, and a method of manufacturing an electrode.

Description of the Related Art

Lithium batteries have high voltage and high energy density, and thus are used in various applications. Devices such as electric vehicles (HEV, PHEV), and the like should be operable at high temperatures, be able to charge or discharge a large amount of electricity, and have long-term usability, and thus require lithium batteries having high-discharge capacity and better lifetime characteristics.

Carbonaceous materials are porous and stable with little volumetric change during charging and discharging. Carbonaceous materials may lead to a low-battery capacity due to the porous structure of carbon. For example, graphite, which is an ultra-high crystalline material, has a theoretical capacity density of about 372 mAh/g when made into a structure in the form of $LiC_6$.

In addition, metals/metalloids that are alloyable with lithium may be used as an anode active material with a higher electrical capacity as compared with carbonaceous materials. Examples of metals/metalloids that are alloyable with lithium are silicon (Si), tin (Sn), aluminum (Al), and the like. These metals/metalloids alloyable with lithium are apt to deteriorate and have relatively poor lifetime characteristics. For example, with repeated charging and discharging operations, repeated agglomeration and breakage of Si particles may occur, leading to electric disconnection.

Therefore, there is a demand for a method with increased tolerance to a volumetric change of the electrode active material to prevent deterioration of the electrode active material, that is, a demand for a lithium battery with improved discharge capacity and lifetime characteristics with increased tolerance to volumetric change of the electrode active material.

SUMMARY

One or more embodiments provide an anode/cathode including a binder with a novel structure, a lithium battery including the anode/cathode, a binder composition, and a method of manufacturing an anode.

Additional aspects will be set forth in part in the description which follows and, in part, will be apparent from the description, or may be learned by practice of the presented embodiments.

According to one or more embodiments, an anode includes: an anode active material; and a porous binder including a nanopore, wherein an anode mixture density is about 1.5 g/cc or greater.

According to one or more embodiments, a lithium battery includes the above-described anode.

According to one or more embodiments, a binder composition includes a reaction product of a polymer with at least one first reactive functional group linked to a main chain, and an oligomer with at least one second reactive functional group able to form an ionic or covalent bond with the at least one first reactive functional group.

According to one or more embodiments, a method of manufacturing an electrode includes: preparing an electrode active material layer including the above-described binder composition; and drying the electrode active material layer in a vacuum at a temperature of about 200° C. or higher to form a nanopore within the binder.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF THE PREFERRED EMBODIMENT

Figure 1:
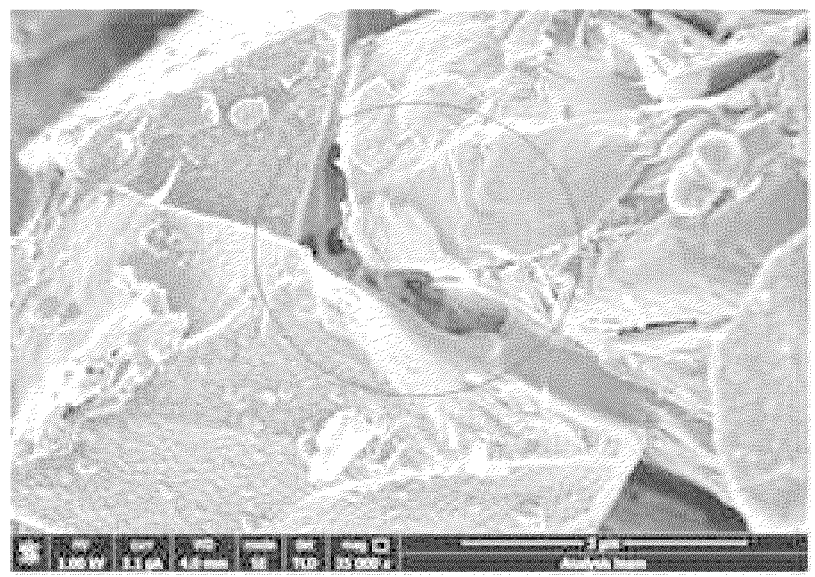
FIG. 1 is a scanning electron microscopic (SEM) image of an anode manufactured in Example 5.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, one or more embodiments of an anode, a cathode, a lithium battery including the anode and/or cathode, a binder composition, and a method of manufacturing an anode will be described in greater detail.

According to an embodiment, an anode includes; an anode active material; and a porous binder including a nanopore, wherein an anode mixture density is about 1.5 g/cc or greater.

The inclusion of the porous binder with nanopores may increase a contact area of the anode with an electrolyte solution, and may effectively accommodate a volumetric change of the anode active material during charging/discharging, thus preventing deterioration of the anode active material. Therefore, a lithium battery including the anode may have improved discharge capacity and lifetime characteristics. The anode mixture density refers to a weight of an anode active material layer per unit volume, the anode active material layer being disposed on a current collector in an anode.

For example, the anode mixture density of the anode may be from about 1.6 g/cc to about 2.0 g/cc, and in some embodiments, from about 1.7 g/cc to about 2.0 g/cc, and in some other embodiments, from about 1.8 g/cc to about 2.0 g/cc. The anode may have a high anode mixture density of about 1.6 g/cc or greater even with pores in the binder.

That is, the porous binder may be contained in the anode active material layer of the anode without a substantially reduction in anode mixture density.

A nanopore size of the porous binder in the anode may be about less than 1000 nm. For example, the nanopore size may be from about 1 nm to less than about 1000 and in some embodiments, may be about 100 nm or less, and in some other embodiments, may be from about 1 nm to about 100 nm or less. The terms "nanopore size" refers to a diameter of nanopores.

As an example, the nanoporous binder included in the anode may have a nanopore size of about less than 1000 nm, as shown from a scanning electron microscopic (SEM) image in FIG. 1.

The porous binder in the anode may have a porosity of about 10 volume % or greater, and in some embodiments, a porosity of about 10 volume % to about 90 volume %, and in some other embodiments, a porosity of about 30 volume % to about 90 volume %, and in still other embodiments, a porosity of about 50 volume % to about 90 volume %, The porous binder of the anode may be a heat-resistant binder. The heat-resistant binder refers to a binder with high thermal stability. In some embodiments, the heat-resistant binder may have a melting point of about 300° C. or higher, or no melting point. Since the porous binder is a thermal-resistance binder, the anode may have improved thermal stability.

For example, the porous binder may be a thermal-resistant binder that is substantially not thermally decomposed or is thermally decomposed in a vacuum at about 200° C. or higher for about 1 hour by an amount of less than about 10% of an initial weight of the porous binder. For example, the porous binder may be a thermal-resistant binder that is substantially not thermally decomposed, or is thermally decomposed in a vacuum at a temperature of about 200° C. to about 300° C. by an amount of less than about 10% of an initial weight of the porous binder.

In some embodiments, the porous binder may include a poly(aryletherketone)-based polymer, a poly(aryl amide)-based polymer (or aramid-based polymer), a polyamic acid-based polymer, a polyimide-based polymer, a poly(amide-imide)-based polymer, a polyurethane-based polymer, a polyester-based polymer (or polyarylate polymer), a polystyrene-based polymer, a polybenzimidazole-based polymer, a polybenzoxazole-based polymer, a polybenzothiazole-based polymer, a polysulfone-based polymer, a poly(ether sulfone)-based polymer, a poly(phenylene sulfide)-based polymer, polyphosphazene, a modified polymer thereof, for example, a fluorinated polymer or a polymer with a sulfone (—$SO_2$—) substituent in a main chain, or a copolymer thereof, for example, a random copolymer, a block copolymer, or an alternating polymer with other polymers. The porous binder is not limited thereto, and any thermally-resistant binder available in the art may be used.

The anode active material may include a metal/metalloid alloyable with lithium, an alloy thereof, or an oxide thereof. Examples of the metal/metalloid alloyable with lithium are Si, Sn, Al, Ge, Pb, Bi, Sb, a Si—Y alloy (where Y is an alkali metal, an alkali earth metal, a Group XIII element, a Group XIV element, a transition metal, a rare earth element, or a combination thereof except for Si), and a Sn—Y alloy (where Y is an alkali metal, an alkali earth metal, a Group XIII element, a Group XIV element, a transition metal, a rare earth element, or a combination thereof except for Sn). Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or combinations thereof. Non-limiting examples of the oxide of the metal/metalloid alloyable with lithium are a lithium titanium oxide, a vanadium oxide, and a lithium vanadium oxide, $SnO_2$, and $SiO_x$, ($0<x<2$).

For example, the anode active material may include at least one element selected from the group consisting of the elements of Groups 13, 14, and 15 of the periodic table of elements.

In some other embodiments, the anode active material may include at least one element selected from the group consisting of Si, Ge, and Sn.

In some embodiments, the anode active material may have a simple particulate form, or may be a nanostructure having a nanosize. In some embodiments, the anode active material may have any of a variety of forms, for example, nanoparticles, nanowires, nanorods, nanotubes, or nanobelts.

The anode may be manufactured as follows.

For example, the anode may be manufactured by molding an anode active material composition including an anode active material and a thermally decomposable binder into a desired shape, or coating the mixed anode material on a current collector such as a copper foil, or the like.

In particular, the anode active material, a conducting agent, a thermally decomposable binder, and a solvent are mixed to prepare the anode active material composition. The anode active material composition may be directly coated on a metallic current collector to prepare an anode plate. Alternatively, the anode active material composition may be cast on a separate support to form an anode active material film, which may then be separated from the support and laminated on a metallic current collector to prepare an anode plate. The anode is not limited to the examples described above, and may be one of a variety of types.

After coated on the current collector and/or the substrate, the anode active material composition may be dried at about 80° C. to about 120° C. (first drying step) to remove the solvent, and is then roll-pressed, followed by second drying at about 200° C. to about 400° C. in a vacuum of about $10^{-4}$ torr or less to remove a thermally decomposable functional group from the thermally decomposable binder, thereby resulting in the anode including the porous binder.

In some embodiments, the anode active material composition may further include another carbonaceous anode active material, in addition to the above-described anode active material.

Examples of the carbonaceous anode active material are crystalline carbon, amorphous carbon, and mixtures thereof.

Non-limiting examples of the crystalline carbon are graphite, such as natural graphite or artificial graphite that are in amorphous, plate, flake, spherical or fibrous form. Non-limiting examples of the amorphous carbon are soft carbon (carbon sintered at low temperatures), hard carbon, meso-phase pitch carbides, sintered corks, graphene, carbon black, fullerene soot, carbon nanotubes, and carbon fibers. Any appropriate material available in the art may be used.

Non-limiting examples of the conducting agent are acetylene black, ketjen black, natural graphite, artificial graphite, carbon black, carbon fiber, and metal powder and metal fiber of, for example, copper, nickel, aluminum or silver. In some embodiments at least one conducting material such as polyphenylene derivatives may be used in combination. Any conducting agent available in the art may be used.

The anode may further include a common binder that is widely used in the art, in addition to the thermally decomposable binder. Non-limiting examples of the common binder are sodium-carboxymethylcellulose (Na-CMC), alginic acid derivatives, chitosan derivatives, polyvinylalcohol (PVA), polyacrylic acid (PAA), polysodiumacrylate (Na-PAA), polyvinylpyrrolidone (PVP), polyacrylamide (PAAm), a vinylidene fluoride/hexafluoropropylene copolymer (P(VDF-HFP)), polyvinylidenefluoride (PVDF), polyacrylonitrile (PAN), water-borne styrene-butadiene rubber (SBR), water-borne butadiene rubber (BR), a modified product thereof, for example, a fluorinated polymer or a polymer with a sulfone ($-SO_2-$) substituent in a main chain, or a copolymer thereof, for example, a random copolymer, a block copolymer, or an alternating polymer with other polymers.

When the thermally decomposable binder and the common binder are used together, a mixing ratio of these binders may be appropriately adjusted if required. For example, a mixing ratio by weight of the thermally decomposable binder to the common binder on solid content basis may be from about 99:1 to about 50:50, and in some other embodiments, from about 95:5 to about 50:50, and in some other embodiments, from about 90:10 to about 50:50, and in still other embodiments, from about 80:20 to about 50:50.

Non-limiting examples of the solvent are N,N-dimethylamide, N,N-dimethyacetamide, methylethylketone, cyclohexanone, acetic acid ethyl, acetic acid butyl, cellosolve acetate, propylene glycol monomethylether, methylcellosolve, butyl cellosolve, methylcarbitol, butylcarbitol, propylene glycol monomethylether, diethylene glycol dimethylether, toluene, xylene, N-methyl-pyrrolidone, acetone, and water. Any material available as a solvent in the art may be used.

The amounts of the anode active material, the conducting agent, the thermally decomposable binder, and the solvent are those levels generally used in lithium batteries. At least one of the conducting agent and the solvent may not be used according to the use and the structure of the lithium battery. Any kind of various additives, for example, a dispersing agent, a thickening agent, or a filler, may be further used in the manufacture of the anode if required.

According to another embodiment, a cathode includes; a cathode active material; and a porous binder including a nanopore, wherein a cathode mixture density is about 3.0 g/cc or greater. The inclusion of the porous binder with nanopores may increase a contact area of the cathode with an electrolyte solution, and may effectively accommodate a volumetric change of the cathode during charging/discharging. Therefore, a lithium battery including the cathode may have improved discharge capacity and lifetime characteristics.

For example, the cathode mixture density of the cathode may be from about 3.2 g/cc to about 4.5 g/cc, and in some embodiments, from about 3.3 g/cc to about 4.5 g/cc, and in some other embodiments, from about 3.4 g/cc to about 4.5 g/cc. The cathode may have a high cathode mixture density of about 3.2 g/cc or greater even with pores in the binder.

That is, the porous binder may be contained in the cathode without a substantially reduction in cathode mixture density.

Non-limiting examples of the porous binder for the cathode are sodium-carboxymethylcellulose (Na-CMC), alginic acid derivatives, chitosan derivatives, polyvinylalcohol (PVA), polyacrylic acid (PAA), polysodiumacrylate (Na-PAA), polyvinylpyrrolidone (PVP), polyacrylamide (PAAm), a vinylidene fluoride/hexafluoropropylene copolymer (P(VDF-HFP)), polyvinylidenefluoride (PVDF), polyacrylonitrile (PAN), a polyurethane-based polymer, a polyester-based polymer, a polyacryl-based polymer, a modified product thereof, for example, a fluorinated polymer or a polymer with a sulfone ($-SO_2-$) substituent in a main chain, or a copolymer thereof, for example, a random copolymer, a block copolymer, or an alternating polymer with other polymers. Any binder with thermal resistance available in the art may be used.

According to another embodiment, a lithium battery includes an anode including the above-described porous binder including nanopores. The lithium battery may be manufactured in the following manner.

First, an anode is prepared according to the above-described anode manufacturing method.

Next, a cathode is prepared. The cathode may be manufactured as follows.

A cathode active material, a conducting agent, a binder, and a solvent are mixed to prepare a cathode active material composition. The cathode active material composition is directly coated on a metallic current collector and dried to prepare a cathode plate. Alternatively, the cathode active material composition may be cast on a separate support to form a cathode active material film, which may then be separated from the support and laminated on a metallic current collector to prepare a cathode plate.

The cathode active material may include at least one selected from the group consisting of lithium cobalt oxide, lithium nickel cobalt manganese oxide, lithium nickel cobalt aluminum oxide, lithium iron phosphorous oxide, and lithium manganese oxide. The cathode active material is not limited to these examples, and may be any cathode active material available in the art.

In some embodiments, the cathode active material may be a compound selected from the group consisting of $Li_aA_{1-b}B_bD_2$ (where $0.90 \leq a \leq 1.8$, and $0 \leq b \leq 0.5$); $Li_aE_{1-b}B_bO_{2-c}D_c$ (where $0.90 \leq a \leq 1.8$, $0 \leq b \leq 0.5$, and $0 \leq c \leq 0.05$); $LiE_{2-b}B_bO_{4-c}D_c$ (where $0 \leq b \leq 0.5$, and $0 \leq c \leq 0.05$); $Li_aNi_{1-b-c}Co_bB_cD_\alpha$ (where $0.90 \leq a \leq 1.8$, $0 \leq b \leq 0.5$, $0 \leq c \leq 0.05$, and $0 \leq \alpha \leq 2$); $Li_aNi_{1-b-c}Co_bB_cO_{2-\alpha}F_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB_cO_{2-\alpha}F_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$, and $0.001 \leq b \leq 0.1$); $Li_aCoG_bO_2$ (where $0.90 \leq a \leq 1.8$, and $0.001 \leq b \leq 0.1$); $Li_aMnG_bO_2$ (where $0.90 \leq a \leq 1.8$, and $0.001 \leq b \leq 0.1$); $Li_aMn_2G_bO_4$ (where $0.90 \leq a \leq 1.8$, and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the formulae above, A is selected from the group consisting of nickel (Ni), cobalt (Co), manganese (Mn), and combinations thereof; B is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from the group consisting of oxygen (O), fluorine (F), sulfur (S), phosphorus (P), and combinations thereof; E is selected from the group consisting of cobalt (Co), manganese (Mn), and combinations thereof; F is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; I is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Cu), and combinations thereof.

The compounds listed above as cathode active materials may have a surface coating layer (hereinafter, "coating layer"). Alternatively, a mixture of a compound without having a coating layer and a compound having a coating layer, the compounds being selected from the compounds listed above, may be used. The coating layer may include at least one compound of a coating element selected from the group consisting of oxide, hydroxide, oxyhydroxide, oxycarbonate, and hydroxycarbonate of the coating element. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof.

The coating layer may be formed using any method that does not adversely affect the physical properties of the cathode active material when a compound of the coating element is used. For example, the coating layer may be formed using a spray coating method, a dipping method, or the like. This is obvious to those of skill in the art, and thus a detailed description thereof will be omitted.

Examples of the cathode active material include $LiNiO_2$, $LiCoO_2$, $LiMn_xO_{2x}$ (x=1, 2), $LiNi_{1-x}Mn_xO_2$ (0<x<1), $LiNi_{1-x-y}Co_xMn_yO_2$ (0≤x≤0.5, 0≤y≤0.5), $LiFeO_2$, $V_2O_5$, TiS, and MoS.

The conducting agent, the binder and the solvent used for the cathode active material composition may be the same as those used for the anode active material composition.

In some other embodiments a plasticizer may be further added into the cathode active material composition and/or the anode active material composition to further form pores in the electrode plates.

The amounts of the cathode electrode active material, the conducting agent, the binder, and the solvent are those levels that are generally used to the manufacture of a lithium battery. At least one of the conducting agent and the solvent may not be used according to the use and the structure of the lithium battery. Any kind of various additives, for example, a dispersing agent, a thickening agent, or a filler, may be further used in the manufacture of the cathode if required.

A separator to be disposed between the cathode and the anode is prepared.

Any separator that is commonly used for lithium batteries may be used. In particular, a separator having low resistance to migration of ions in an electrolyte and an excellent electrolyte-retaining ability may be used. Examples of the separator include glass fiber, polyester, Teflon, polyethylene, polypropylene, polytetrafluoroethylene (PTFE), and a combination thereof, each of which may be a non-woven or woven fabric. For example, a rollable separator including polyethylene or polypropylene may be used for a lithium ion battery. A separator with a good organic electrolyte solution-retaining ability may be used for a lithium ion polymer battery.

The separator may be a monolayer or a multilayer including at least two layers. For example, the separator may be a mixed multi-layer, for example, a two-layered separator including polyethylene and polypropylene layers, a three-layered separator including polyethylene, polypropylene and polyethylene layers, or a three-layered separator including polypropylene, polyethylene and polypropylene layers.

The separator may have a thickness of about 5 μm to about 20 μm and a pore diameter of about 0.01 μm to about 10 μm, but not limited thereto, which may be appropriately adjusted according to the use of the lithium battery.

For example, the separator may be manufactured as follows.

A polymer resin, a filler, and a solvent may be mixed together to prepare a separator composition. The separator composition may be directly coated on an electrode, and then dried to form the separator. Alternatively, the separator composition may be cast on a support and then dried to form a separator film, which may then be separated from the support and laminated on an electrode to form the separator.

The polymer resin used to manufacture the separator may be any material that is commonly used as a binder for electrode plates. Examples of the polymer resin include a vinylidenefluoride/hexafluoropropylene copolymer, polyvinylidene fluoride (PVDF), polyacrylonitrile, polymethylmethacrylate and a mixture thereof.

The filler used in preparing the separator may be inorganic particles, such as alumina ($Al_2O_3$), silica ($SiO_2$), and titania ($TiO_2$). Non-limiting examples of the solvent are water, ethanol, acetone, N-methylpyrrolidone (NMP), and toluene. The filler and/or solvent may not be used if required.

Next, an electrolyte is prepared.

For example, the electrolyte may be an organic electrolyte solution. Alternately, the electrolyte may be in a solid phase. The solid electrolyte may be an organic solid electrolyte or an inorganic solid electrolyte.

The organic solid electrolyte may be a polymer including, for example, a polyethylene derivative, a polyethylene oxide derive, a polypropylene oxide derivative, a phosphoric acid ester polymer, a polylysine, polyester sublime, polyvinyl alcohol, polyfluorinated vinylidene, or an ionic dissociable group, but is not limited thereto. Any organic solid electrolyte available in the art may be used.

Non-limiting examples of the inorganic solid electrolyte are lithium nitrides, lithium nitroxides, lithium halides, lithium sulfates, and boron oxides, for example, $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$. Any solid electrolyte available in the art may be used.

The inorganic solid electrolyte may be formed on the electrode by, for example, sputtering.

The organic electrolyte solution may be prepared by dissolving a lithium salt in an organic solvent.

The organic solvent may be any solvent available as an organic solvent in the art. Examples of the organic solvent are propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, and mixtures thereof.

The lithium salt may be any material available as a lithium salt in the art. Examples of the lithium salt are $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each independently a natural number), LiCl, LiI and a mixture thereof.

Figure 3:
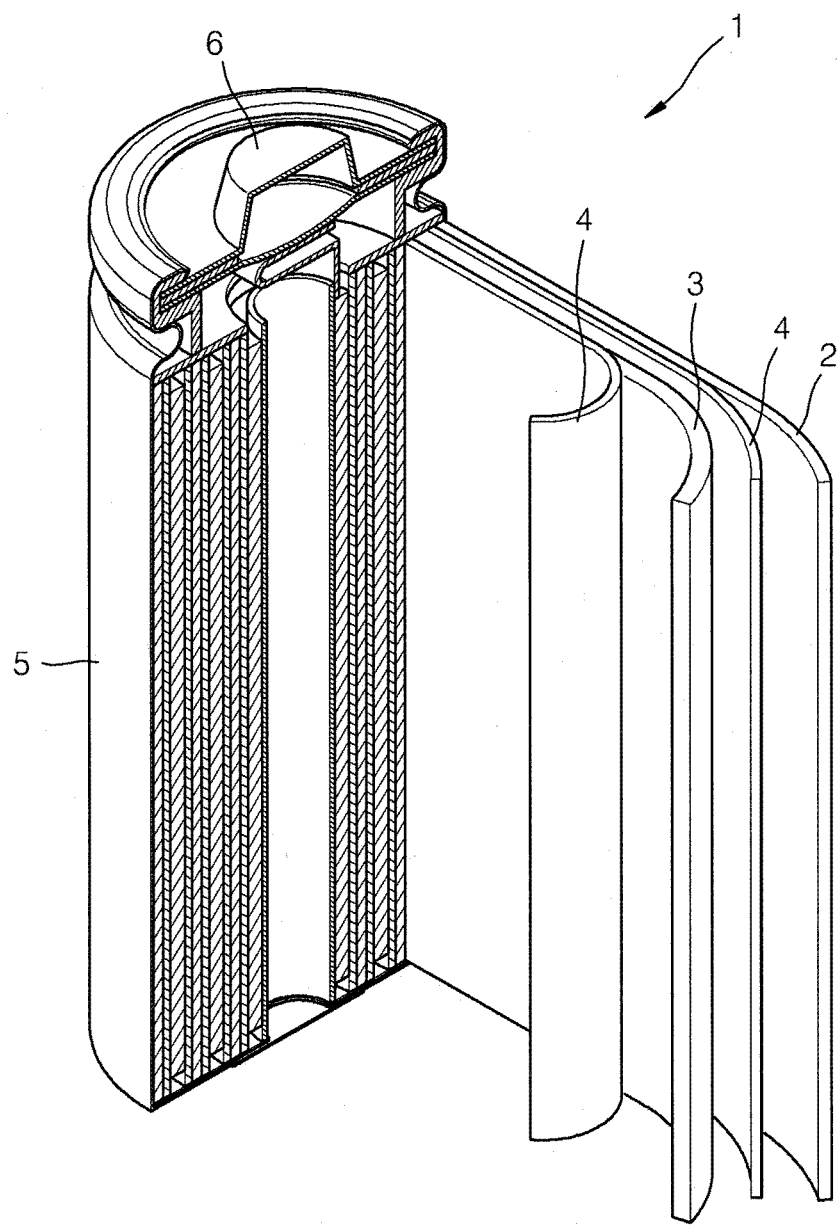
FIG. 3 is a schematic view of a lithium battery according to an embodiment.

Referring to FIG. 3, a lithium battery 1 includes a cathode 3, an anode 2, and a separator 4. The cathode 3, the anode 2 and the separator 4 are wound or folded, and then sealed in a battery case 5. The battery case 5 is filled with an organic electrolyte solution and sealed with a cap assembly 6, thereby completing the manufacture of the lithium battery 1. The battery case 5 may be a cylindrical type, a rectangular type, or a thin-film type. For example, the lithium battery may be a thin-film type battery. The lithium battery may be a lithium ion battery.

The separator may be interposed between the cathode and the anode to form a battery assembly. Alternatively, the battery assembly may be stacked in a bi-cell structure and impregnated with the electrolyte solution. The resultant is put into a pouch and hermetically sealed, thereby completing the manufacture of a lithium ion polymer battery.

Alternatively, a plurality of battery assemblies may be stacked to form a battery pack, which may be used in any device that operates at high temperatures and requires high output, for example, in a laptop computer, a smart phone, electric vehicle, and the like.

The lithium battery may have improved high rate characteristics and lifetime characteristics, and thus may be applicable in an electric vehicle (EV), for example, in a hybrid vehicle such as plug-in hybrid electric vehicle (PHEV).

According to another embodiment, a binder composition includes a reaction product of a polymer with at least one first reactive functional group linked to a main chain, and an oligomer with at least one second reactive functional group able to form an ionic or covalent bond with the at least one first reactive functional group.

The reaction product may be a product of ionic bonding and/or covalent bonding between the first reactive functional group of the polymer and the second reactive functional group of the oligomer.

In some embodiments, the reaction product may be a thermally decomposable polymer obtained from ionic bonding and/or covalent bonding of a plurality of first reactive functional groups in the polymer with the second reactive group of the oligomer.

In some embodiments, the polymer may include a poly(aryletherketone)-based polymer, a poly(aryl amide)-based polymer (or aramid based polymer), a polyamic acid-based polymer, a polyimide-based polymer, a poly(amide-imide)-based polymer, a polyurethane-based polymer, a polyester-based polymer (or polyaryllate polymer), a polystyrene-based polymer, a polybenzimidazole-based polymer, a polybenzoxazole-based polymer, a polybenzothiazole-based polymer, a polysulfone-based polymer, a poly(ether sulfone)-based polymer, a poly(phenylene sulfide)-based polymer, polyphosphazene, a modified polymer thereof, for example, a fluorinated polymer or a polymer with a sulfone ($—SO_2—$) substituent in a main chain, or a copolymer thereof, for example, a random copolymer, a block copolymer, or an alternating polymer with other polymers. The porous binder is not limited thereto, and any polymer with a reactive functional group available in the art may be used.

For example, the polymer may be a thermal-resistant polymer that is substantially not thermally decomposed or is thermally decomposed in a vacuum at a temperature of about 200° C. to about 300° C. for about 1 hour by an amount of less than about 10% of an initial weight of the polymer.

The first reactive functional group and the second reactive functional group in the binder composition may be each independently at least one functional group of a hydroxyl group, a carboxyl group, an amine group, a cationic group, and an anionic group.

The oligomer may have a weight average molecular weight of about 20000 g/mole or less, and in some embodiments, a weight average molecular weight of about 100 g/mole to about 20000 g/mole. When the weight average molecular weight of the oligomer is too low, the porous binder may have too low porosity. When the weight average molecular weight of the oligomer is too high, the porous binder may have too high porosity or too large pores so that lifting and/or cracking of the electrode active material layer may occur.

The oligomer may further include at least one thermally decomposable functional group. The thermally decomposable functional group may be a methylene oxide group, an ethylene oxide group, a propylene oxide group, or a combination thereof, for example, a methylene oxide ethylene oxide group, or an ethylene oxide propylene oxide group.

In some embodiments, the oligomer may be represented by one of Formulae 1 and 2 below:

Formula 1

Formula 2

In Formulae 1 and 2, X and Y may be each independently a reactive functional group selected from the group consisting of —OH, —COOH, —NH$_2$, —NHR$_3$, —NR$_4$R$_5$, a cationic group, and an anionic group;

R$_1$ and R$_2$ are substituents including a thermally decomposible functional group; and R$_3$, R$_4$ and R$_5$ are each independently a C1-C20 alkyl group substituted or unsubstituted with halogen, or a C6-C20 aryl group substituted or unsubstituted with halogen.

In some embodiments, the thermally decomposable functional group may be represented by one of Formulae 3 to 5 below:

FORMULA 3

FORMULA 4

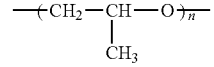

FORMULA 5

In Formulae 3 to 5, l, m, and n are a real number of from 5 to 500.

An amount of the thermally decomposable functional group may be about 50 wt % or higher of a total weight of the substituents represented by R$_1$ and R$_2$. When the amount of the thermally decomposable functional group is too small, it may be difficult to prepare the porous binder through thermal decomposition. The rest of the substituents R$_2$, excluding the thermally decomposible functional group, may be a covalent bond, a C1-C20 alkylene group, a C6-C20 arylene group, but is not limited thereto. The rest of the substituents $R_1$, excluding the thermally decomposible functional group, may be a hydrogen atom, a C1-C20 alkyl group, a C6-C20 aryl group, but is not limited thereto.

The oligomer of the binder composition may have a thermal decomposition temperature of about 200° C., and in some embodiments, a thermal decomposition temperature of about 200° C. to about 300° C.

In some embodiments, the binder composition may further include a common binder, in addition to the thermally decomposable binder. For example, the further inclusion of the common binder may prevent lifting and cracking of the electrode active material layer. A mixing ratio of the thermally decomposable binder to the common binder may be from about 95:5 to about 50:50 on solid content basis. In some embodiments, the mixing ratio of the thermally decomposable binder to the common binder may be from about 90:10 to about 50:50 on solid content basis.

According to another embodiment, a method of manufacturing an electrode include preparing an electrode active material layer including the above-described binder composition; and drying the electrode active material layer in a vacuum at a temperature of about 200° C. or higher to form a nanopore within the binder.

In some embodiments, the electrode manufacturing method may include: coating an electrode active material composition on a substrate and/or a current collector to form an electrode active material layer; drying the electrode active material layer at a temperature of about 80° C. to about 120° C. (a first drying process); punching, press-rolling, and welding an anode with the dried electrode active material layer; and drying the welded anode at a temperature of about 200° C. to about 350° C. in a vacuum (a second drying process). The second drying process leads to thermal decomposition of the thermally decomposable component of the binder so that nanopores are formed. The second drying time may be from about 10 minutes to about 10 hours but is not limited thereto:

For example, the electrode manufacturing method may include the above-described anode manufacturing method and/or cathode manufacturing method.

One or more embodiments will now be described in more detail with reference to the following examples. However, these examples are for illustrative purposes only and are not intended to limit the scope of the one or more embodiments.

Preparation of Binder Composition

Preparation Example 1

Preparation of Polymer A

While a dried reaction vessel equipped with a stirrer was purged with nitrogen gas, 15.5 g (50 mmol) of 4,4'-oxydiphthalic anhydride (ODPA) and 127.1 g of purified N-methylpyrrolidone (NMP) were put into the reaction vessel and stirred at room temperature in the nitrogen atmosphere until dissolved, followed by adding 9.91 g (50 mmol) of 4,4'-methylendianiline (MDA). Afterward, the reaction mixture was stirred at room temperature for about 12 hours, so that a polyamic acid (Polymer A) solution having a 15% solid content was prepared. The prepared polyamic acid had a weight average molecular weight (Mw) of about 144,000 g/mol.

Preparation Example 2

Preparation of Polymer B

While a dried reaction vessel equipped with a stirrer was purged with nitrogen gas, 4.0 g (20 mmol) of 4,4'-oxydianiline and 2.32 g (20 mmol) of 1,6-hexanediamine, 4.04 g (40 mmol) of triethylamine, and 20 ml of NMP were put into the reaction vessel and stirred to obtain a mixture, and the temperature of the reaction vessel was cooled to 0° C. on a water/ice bath.

8.42 g (40 mmol) of trimellitic anhydride chloride was put into the cooled reaction vessel and then stirred for about 30 minutes.

Subsequently the water/ice bath was removed away from the reaction vessel to increase the temperature of the reaction vessel to room temperature, followed by further stirring for about 6 hours to obtain a viscous product. The reaction product was slowly added to 2 l of a 0° C., 0.01M HCl solution to obtain a precipitate, which was then mixed again with vigorous stirring for 1 hour. Subsequently, the precipitate was filtered through a filter, and washed with a 0.01M HCl solution and then with pure water, followed by drying in a 90° C. vacuum oven for about 3 hours to prepare poly(amide-imide) (Polymer B) powder. The polyamide-imide had a weight average molecular weight (Mw) of about 125,000 g/mol.

Example 1

50 g of the polymer solution prepared in Example 1 and 2.22 g of poly(ethylene glycol) bis(3-aminopropyl) terminated (Mw 1,500 g/mol) as an oligomer were put with stirring, into a reaction vessel equipped with a stirrer. Subsequently, 0.86 g of dimethylethylamine was slowly added thereinto to increase solubility in water. After further stirring for about 6 hours, the reaction product was slowly added into a vessel containing 2 L of acetone with stirring to induce precipitation. The resulting precipitate was filtered, washed, and dried in a 60° C.-vacuum oven for about 3 hours to obtain dried powder. 2 g of the dried powder was dissolved in 18 g of pure water, so that a binder composition with a 10% solid content was prepared.

Example 2

5 g of the polymer powder prepared in Example 2 and 100 g of pure water were put into a reaction vessel equipped with a stirrer, and 2.04 g of poly(ethyleneglycol) bis(3-aminopropyl) terminated (Mw=1,500 g/mol) as an oligomer was added thereto with stirring. Subsequently, 0.8 g of dimethylethylamine was slowly added thereinto to increase solubility in water. After further stirring for about 6 hours at room temperature, the reaction product was slowly added into a vessel containing 2 L of acetone with stirring to induce precipitation. The resulting precipitate was filtered, washed, and dried in a 60° C.-vacuum oven for about 3 hours to obtain dried powder. 2 g of the dried powder was dissolved in 18 g of pure water, so that a binder composition with a 10% solid content was prepared.

Example 3

50 g of the polymer solution prepared in Example 1 was put into a reaction vessel equipped with a stirrer, and 3.0 g of poly(ethyleneglycol) bis(2-aminopropyl) terminated (Mn~4,000 g/mol) as an oligomer was added thereto with stirring. Subsequently, 0.8 g of dimethylethylamine was slowly added thereinto to increase solubility in water. After further stirring for about 6 hours at room temperature, the reaction product was slowly added into a vessel containing 2 L of acetone with stirring to induce precipitation. The resulting precipitate was filtered, washed, and dried in a 60° C.-vacuum oven for about 3 hours to obtain dried powder. 2 g of the dried powder was dissolved in 18 g of pure water, so that a binder composition with a 10% solid content was prepared.

Example 4

50 g of the polymer solution prepared in Example 1 was put into a reaction vessel equipped with a stirrer, and 2.5 g of polypropylene glycol)-block-poly(ethylene glycol)-block-poly(propylene glycol) bis(2-aminopropyl ether) (Mn~2,000 g/mol) as an oligomer was added thereto with stirring.

Subsequently, 0.8 g of dimethylethylamine was slowly added thereinto to increase solubility in water.

After further stirring for about 6 hours at room temperature, the reaction product was slowly added into a vessel containing 2 L of acetone with stirring to induce precipitation.

The resulting precipitate was filtered, washed, and dried in a 60° C.-vacuum oven for about 3 hours to obtain dried powder.

2 g of the dried powder was dissolved in 18 g of pure water, so that a binder composition with a 10% solid content was prepared.

Manufacture of Anode and Lithium Battery

Example 5

Anode Including Thermally Decomposable Binder 12.9 g of the binder composition prepared in Example 1, 12 g of an Si alloy, 6.8 g of graphite, and 0.2 g of ketjen black as a conducting agent were mixed together to prepare anode active material slurry.

The slurry was coated on a Cu-foil current collector to a thickness of about 10 μm. The resultant was dried at about 110° C. for about 30 minute (first drying) to manufacture an anode plate. Subsequently, after punching, press-rolling, and welding the anode plate, the anode plate was dried in a vacuum oven at about 300° C. for 2 hours to prepare an anode. A scanning electron microscopic (SEM) image of the porous binder including nanopores in the anode is shown in FIG. 1. The anode had an anode mixture density of about 1.7 g/cc.

20 g of a 1:1 mixture by weight of $LiCoO_2$(LCO) and $LiNi_{1/3}CO_{1/3}Mn_{1/3}O_2$(NCM) and 1.1 g of a carbon conducting agent (Super P, available from TIMCAL Ltd.) were uniformly mixed together, and then a polyvinylidene fluoride (PVDF) binder solution was added thereinto to prepare cathode active material slurry with a mixing ratio of the mixed active material, the carbon conducting agent, and the binder was 90:5:5. The cathode active slurry was coated on a 15 μm-thick aluminum foil and then dried to form a cathode plate. Subsequently, after punching, press-rolling, and welding the cathode plate, the cathode plate was dried in a vacuum oven at about 130° C. for 12 hours (second drying) to prepare an anode.

A 2016R type coin cell was manufactured using the anode and the cathode.

A polypropylene separator, and an electrolyte including 1.0M $LiPF_6$ dissolved in a mixed solvent of ethylenecarbonate (EC) and diethylcarbonate (DEC) in a 1:1 volume ratio were used.

Example 6

An anode, a cathode, and a lithium battery were manufactured in the same manner as in Example 5, except that the binder composition of Example 2 was used.

The anode had an anode mixture density of about 1.72 g/cc.

Example 7

An anode, a cathode, and a lithium battery were manufactured in the same manner as in Example 5, except that the binder composition of Example 3 was used.

The anode had an anode mixture composition density of about 1.71 g/cc.

Example 8

An anode, a cathode, and a lithium battery were manufactured in the same manner as in Example 5, except that the binder composition of Example 4 was used.

The anode had an anode mixture density of about 1.68 g/cc.

Comparative Example 1

An anode, a cathode, and a lithium battery were manufactured in the same manner as in Example 5, except that the polymer solution of Preparation Example 1 was used as the binder composition.

Evaluation Example 1

Evaluation of Thermal Decomposition Characteristics

Figure 2:
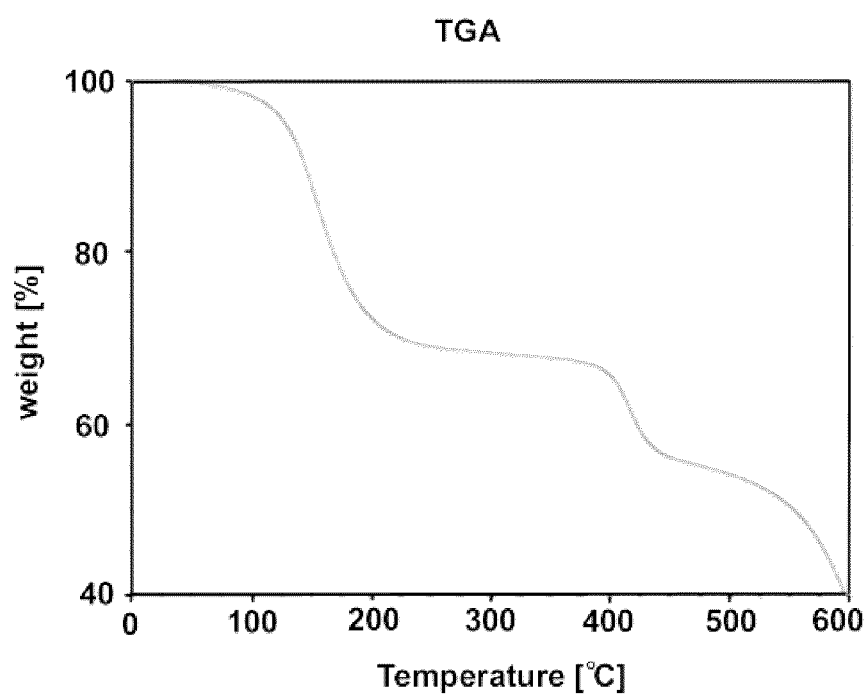
FIG. 2 is a thermogravimetric analysis (TGA) graph of a binder prepared in Example 1.

As a result of a thermogravimetric analysis (TGA) on the binder prepared in Example 1, TGA data are shown in FIG. 2.

Referring to FIG. 2, the thermally decomposable components were completely decomposed to a temperature of about 200° C.

Evaluation Example 2

Evaluation of Charge-Discharge Characteristics

The coin cells manufactured in Examples 5-8 and Comparative Example 1 were each charged with a constant current of 0.05 C at 25° C. until a cell voltage reached about 4.35V with respect to the Li metal, followed by discharging with a constant current of 0.5 C until the voltage reached about 2.75V (with respect to Li) (formation process).

Subsequently, each of the lithium batteries after the formation process was charged with a constant current of 0.5.5 C rate at about 25° C. until the voltage of the cell reached about 4.35V (with respect to Li), followed by discharging with a constant current of about 1.0 C until the voltage reached about 2.75V (with respect to Li). This cycle of charging and discharging was repeated 50 times.

Some of the charging/discharging test results are shown in Table 1 and FIG. 2. Capacity retention rate is expressed as Equation 2 below.

$$\text{Charge/discharge efficiency (\%)} = \text{Discharge capacity}/\text{Charge capacity} \times 100 \quad \text{Equation 1}$$

$$\text{Capacity retention rate (\%)} = [\text{50th cycle discharge capacity}/\text{1}^{st}\text{ cycle discharge capacity}] \times 100 \quad \text{Equation 2}$$

TABLE 1

|  | Discharge capacity at $1^{st}$ cycle [(mAh/cc] | Discharge capacity at $10^{th}$ cycle [mAh/cc] | Capacity retentionrate at $50^{th}$ cycle [%] |
|---|---|---|---|
| Example 5 | 1120 | 941 | 84% |
| Example 6 | 1123 | 955 | 85% |
| Example 7 | 1125 | 923 | 82% |
| Example 8 | 1117 | 894 | 80% |
| Comparative Example 1 | 1121 | 807 | 72% |

Referring to Table 1, the lithium batteries of Examples 5 to 8 are found to have improved lifetime characteristics as compared with that of Comparative Example 1. The lithium batteries of Examples 5 to 8 were found to have improved discharge capacities relative to graphite.

As described above, according to the one or more of the above embodiments, a lithium battery may have improved discharge capacity and lifetime characteristics by using an anode and/or a cathode that include the above-described porous binder.

It should be understood that the example embodiments described therein should be considered in a descriptive sense only and not for purposes of limitation. Descriptions of features or aspects within each embodiment should typically be considered as available for other similar features or aspects in other embodiments.

What is claimed is:

1. An anode comprising; an anode active material; and a porous binder including a nanopore having a size of more than 0 to less than or equal to 100 nm,
   wherein the porous binder comprises a poly(aryletherketone)-based polymer, a poly(aryl amide)-based polymer, a polyamic acid-based polymer, a polyimide-based polymer, a poly(amide-imide)-based polymer, a polyurethane-based polymer, a polyester-based polymer, a polystyrene-based polymer, a polybenzimidazole-based polymer, a polybenzoxazole-based polymer, a polybenzothiazole-based polymer, a polysulfone-based polymer, a poly(ether sulfone)-based polymer, a poly(phenylene sulfide)-based polymer, polyphosphazene, or a copolymer thereof,
   wherein the anode active material comprises at least one element selected from the group consisting of the elements of Groups 13, 14, and 15 of the periodic table of elements.

2. The flit anode of claim 1, wherein the anode mixture density is from about 1.6 g/cc to about 2.0 g/cc.

3. The anode of claim 1, wherein the nanopore has a size of more than 0 to less than 100 nm.

4. The anode of claim 1, wherein the porous binder has a porosity of about 10% or greater.

5. The anode of claim 1, wherein the porous binder is a heat-resistant binder.

6. The anode of claim 1, wherein an amount of the porous binder that is thermally decomposed in a vacuum at about 200° C. or higher for about 1 hour is less than about 10% of the initial weight of the porous binder.

7. The anode of claim 1, wherein the anode active material comprises a metal/metalloid alloyable with lithium, an alloy thereof, or an oxide thereof.

8. The anode of claim 1, wherein the anode active material comprises at least one metal selected from the group consisting of Si, Ge and Sn.

9. A lithium battery comprising the anode of claim 1.

* * * * *